Nov. 25, 1958 D. V. WRIGHT 2,861,455
BALANCING MACHINE
Filed May 27, 1953 2 Sheets-Sheet 1
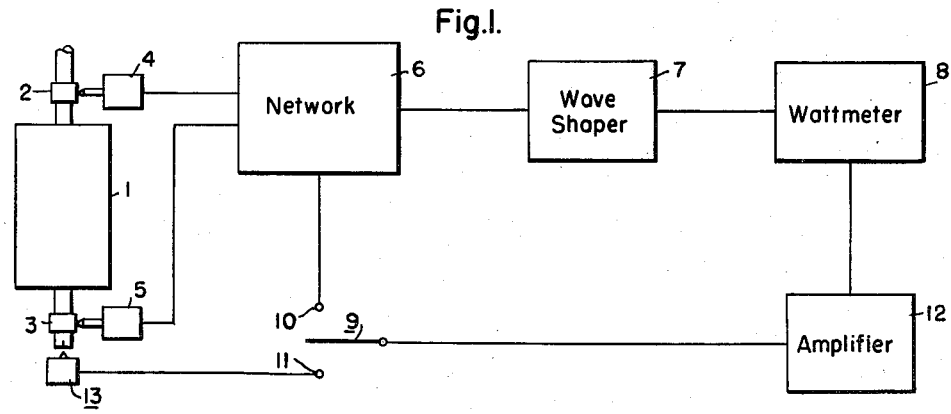
Fig.1.
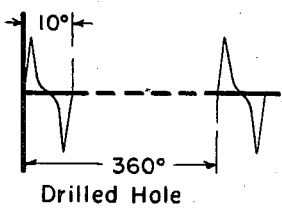
Fig.3a. Drilled Hole
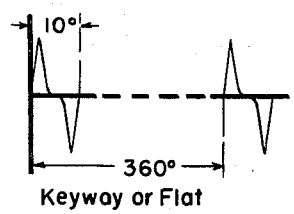
Fig.3b. Keyway or Flat
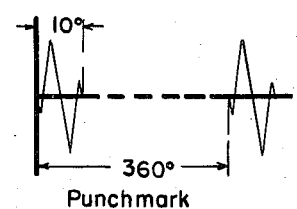
Fig.3c. Punchmark
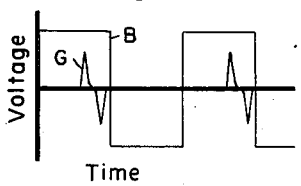
Fig.4a.
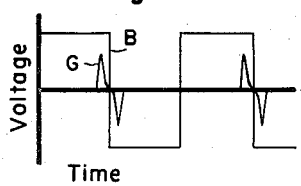
Fig.4c.
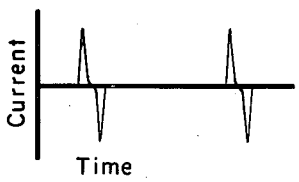
Fig.4b.
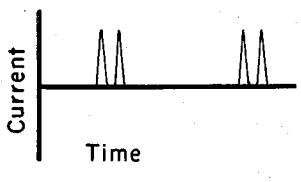
Fig.4d.
WITNESSES:
E. A. M?Closkey.
Urban H. Faubion
INVENTOR
Dexter V. Wright.
BY
Paul E. Friedemann
ATTORNEY Nov. 25, 1958      D. V. WRIGHT      2,861,455
BALANCING MACHINE Filed May 27, 1953      2 Sheets-Sheet 2

WITNESSES:

INVENTOR
Dexter V. Wright.
BY
ATTORNEY

United States Patent Office 2,861,455
Patented Nov. 25, 1958

2,861,455

BALANCING MACHINE

Dexter V. Wright, Verona, Pa., assignor to Westinghouse Electric Corporation, East Pittsburgh, Pa., a corporation of Pennsylvania Application May 27, 1953, Serial No. 357,733

7 Claims. (Cl. 73—463)

This invention relates to balancing machines and more particularly to electrical balancing machines for indicating both the position and magnitude of the unbalance of a rotor in two arbitrarily chosen planes.

The present system is intended to utilize a ring demodulator wattmeter, such as is shown and described in the application of Arthur C. Hagg and Dexter V. Wright entitled, "Apparatus for Analyzing Unbalance of Rotors," filed August 10, 1949 and given Serial No. 109,572, now U. S. Patent 2,636,381, for measuring the magnitude of unbalance of the rotor, although the invention is not limited to its use. The bias for the wattmeter circuit in the above-mentioned application is obtained from a square wave generator of the commutator type, an electromagnetic sine wave generator, a photoelectric type of generator or other types as mentioned. All of these generators require coupling to the shaft of the mass to be balanced except the photoelectric type which would be somewhat complicated, expensive and unreliable.

Coupling a generator directly to the rotating mass to be balanced in the balancing machine introduces serious problems. First, the generator being coupled directly to the rotor to be balanced would reduce the over-all sensitivity of the machine because of the additional mass added to the rotor. Second, each rotor to be balanced would have to be considerably modified so that the generator could be coupled to it without introducing any unbalance in the coupling. Third, some additional "Noise" signal would be introduced. Since these problems become more serious as the size of the rotor to be balanced becomes smaller, there is a definite limitation on the smallest size of rotor that could be balanced on a machine of this kind.

One object of this invention is to provide apparatus for electrically determining the magnitude of unbalance of a rotor in two or more arbitrarily chosen planes.

Another object of this invention is to provide apparatus for determining electrically the phase or position of an unbalance in a rotor.

A further object of this invention is to provide apparatus for determining electrically the phase or position and the magnitude of unbalance of a rotor.

A more specific object of this invention is to accomplish each of the preceding objects without directly coupling a generator to the rotating mass to be balanced.

The objects stated are merely illustrative. Other objects and advantages will become more apparent from a study of the following specification when considered in the light of the accompanying drawings, in which:

Figure 1 is a block diagram of the present improvement;

Figs. 3a, 3b and 3c show the output voltage of the pulse generator with different types of marks on the rotor shaft;

Fig. 4a shows the voltages applied to the ring demodulator wattmeter;

Fig. 4b shows the voltages applied to the ring decurrent milliammeter of the ring demodulator wattmeter with the voltages of Fig. 4a applied to the wattmeter;

Fig. 4c shows the voltages applied to the ring demodulator wattmeter where the generator is properly adjusted as to angle; and Fig. 4d shows the output current with the voltages of Fig. 4c applied to the ring demodulator wattmeter.

Figure 2:
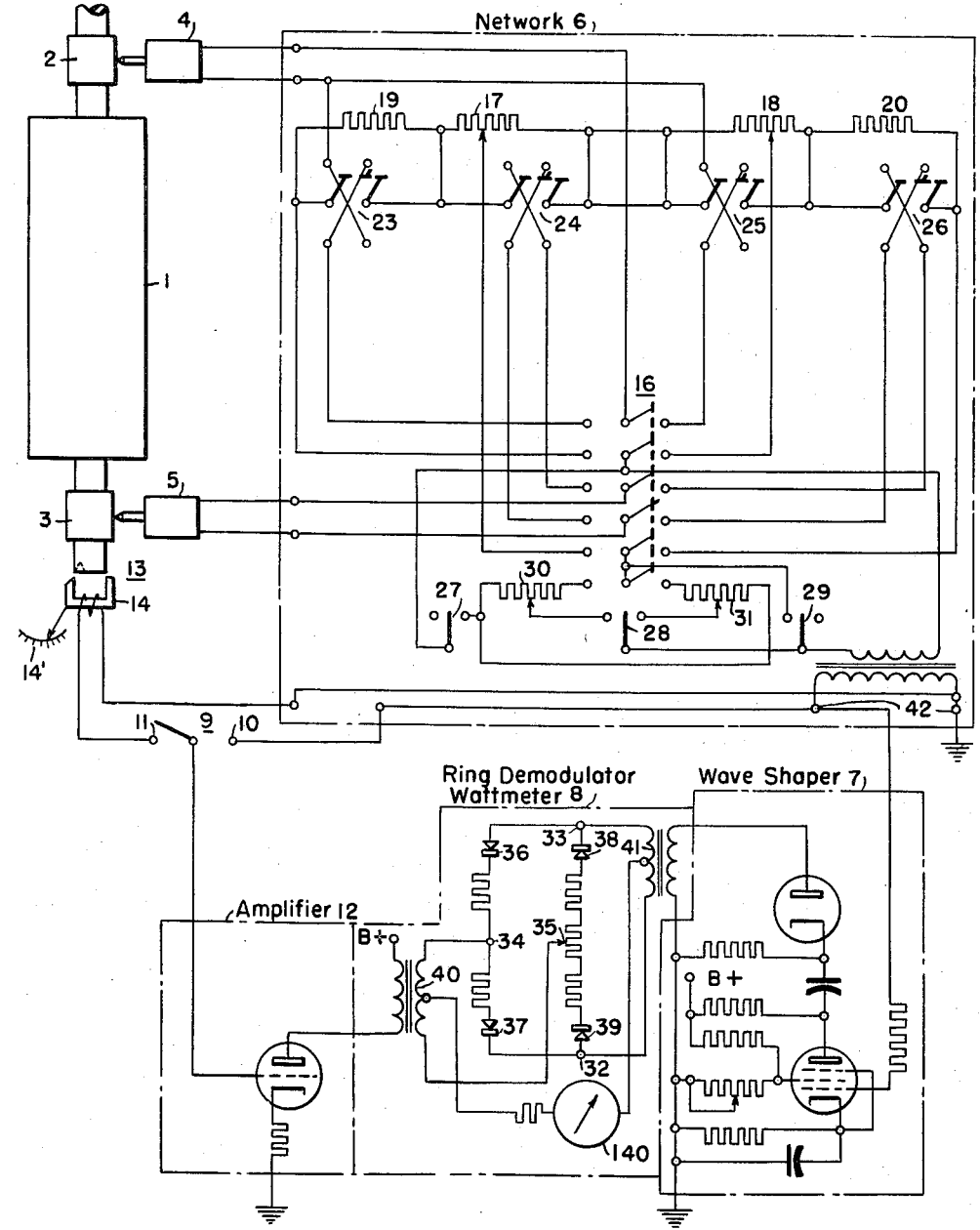
Fig. 2 shows a diagrammatic view of the circuits used in one embodiment of the invention.

In the showing in Fig. 1 the rotor or rotating mass 1 to be balanced is shown mounted to rotate freely in space, with the ends of the shaft disposed in bearings 2 and 3. The simplest and most desirable design, of course, is shown, but the present invention will still produce its results if a fixed pivot suspension is used for the rotors. The pickups 4 and 5 are preferably of the movable coil type and are fixed to the bearings 2 and 3 respectively so that the output voltage of each pickup will bear a given relationship to the vibration of the rotor in the plane of rotation of the rotor that the particular pickup contacts the bearings. The output of the pickups 4 and 5 are fed into a plane separation network 6 which balances a part of the output of one pickup against the output of the other pickup so that the network will have an output which is proportional to the unbalance of the rotor 1 in an arbitrarily selected correction plane. The function of the network will be described in some more detail under the description of Fig. 4 but the exact details and theory of operation of such a network may be found in the J. G. Baker and Frank C. Rushing Patent 2,165,024.

Plane separation network 6 supplies a wave shaper 7 which squares the output of the network 6 and supplies a bias voltage to the ring demodulator wattmeter 8. The use of this system to furnish a bias voltage to the wattmeter eliminates the necessity for coupling a generator directly to the rotating mass to be balanced. To measure the magnitude of the unbalance in the selected correction plane, the ring demodulator wattmeter receives the bias signal as described and the switch 9 completes the circuit to terminal 10. Thus the output of the network 6 is amplified by the amplifier 12 and applied as a signal to the ring demodulator wattmeter 8. The ring demodulator wattmeter is shown and described in detail in the application of Arthur C. Hagg and Dexter V. Wright previously referred to. That application also describes in detail the operation of the ring demodulator wattmeter.

Since the need for a complicated generator to supply the bias for the ring demodulator wattmeter has been eliminated, a simple electromagnetic pulse type generator 13 may be used for measuring the angle of unbalance of the rotating mass to be balanced in the arbitrarily selected correction plane. The details of the pulse generator used are presented with the description of Fig. 2. To measure the angle of unbalance in the selected arbitrarily chosen correction plane, the bias voltage is supplied to the ring demodulator wattmeter 8 as previously described. The switch 9 is closed against terminal 11, and the pulse generator supplies the signal to the ring demodulator wattmeter 8.

Fig. 2 shows the pulse generator 13 and the circuitry in more detail than does the block diagram of Fig. 1. The pulse generator 13 shown has a stator 14 which is a simple magnet with a coil on one leg. The rotor for the pulse generator is comprised of the shaft of the rotating mass 1 which is to be balanced. A small notch on the end of the test rotor shaft varies the reluctance of the magnetic circuit of the generator 13 which includes the permanent magnet stator 14 and the rotor and causes the generator 13 to have an output across its terminals 11 which has a frequency equal to the rotational frequency of the test rotor 1. Various kinds of notches or other means can be used on the end of the shaft.

The generator 13, which is not in contact with the rotor to be balanced, is arranged to have its stator angularly adjustable to change the phase of its signal with respect to the vibration pickup signal from the network 6. The generator stator is adjusted angularly until the ring demodulator wattmeter 8 shows a maximum positive reading. The number of degrees read from the protractor 14' which indicates the angular movement of the stator 14 is the location of the high spot on the unbalance rotor referred to the small notch on the end of the shaft that operates the pulse generator. It is an important feature of the generator 13 that it is not in contact with the rotor to be balanced and therefore does not interfere in any way with the overall sensitivity of the machine. Also, coupling problems are eliminated and a "Noise" signal is not introduced.

The network 6 comprises a main switch 16 which selects the particular correction plane at which the unbalance of the rotor will be measured. For example, if the main switch 16 were in its right hand position, it would measure the unbalance of the rotor in the correction plane nearest the lower pickup 5 and if the main switch 16 is in the left position the unbalance of the rotor will be measured in the correction plane which is nearest the upper pickup 4. The potentiometers 17 and 18 and resistors 19 and 20 are provided to calibrate the magnitude of the voltage from one pickup which will be matched against the voltage from the other pickup so that the output of the network 6 will have a magnitude which represents the magnitude of the unbalance in the correction plane desired. The reversing switches 23, 24, 25 and 26 are provided to insure that the voltage of one pickup is of the proper phase to be matched against the voltage from the other pickup. The switches 27, 28 and 29 and the potentiometers 30 and 31 are provided to determine the sensitivity or scale range of the output of the network 6.

The reversing switch 9 is provided to determine whether the angle of unbalance in the selected correction plane is to be measured or whether the magnitude of unbalance is to be measured. When the switch 9 is closed on terminal 10, the magnitude of unbalance will be measured. The output of the network 6 across its terminals 42 is applied to a conventional amplifier 12. The particular amplifier shown is merely one of a number of types which could be used and, therefore, the circuitry is not described in detail. The output of the amplifier 12 is applied across the diagonal points 34 and 35 of the ring demodulator wattmeter. The output of the network 6 across its terminals 42 is supplied to the input of a conventional wave shaper squarer circuit as indicated in the block 7. The particular circuit shown is only for the purposes of illustration. Other conventional types can be used. The output of the squarer 7 is applied to two diagonal points 32 and 33 of the ring demodulator wattmeter.

The ring demodulator wattmeter consists generally of a bridge network with two pairs of diagonal points 32 and 33, and 34 and 35, and four rectifiers 36, 37, 38 and 39 individually connected between the diagonal points 32 and 33 and all poled in the same sense around the loop circuit. Two impedance members 40 and 41, here shown as the secondaries of coupling transformers from the amplifier 12 and wave shaper 7, are connected across the respective pairs of diagonal points and each has a voltage midpoint with a direct current instrument 140 which is preferably of the milliammeter type connected between the mid taps. The voltage applied across the diagonal points 32 and 33 represents a reference or bias voltage which is, of course, phase related to the rotation of the rotating mass 1 which is to be balanced and which should always be at least about twice as much as the voltage applied across the diagonal points 34 and 35. The voltage from the amplifier 12 applied across the diagonal points 34 and 35 is the signal voltage. The voltage applied between the diagonal points 32 and 33 or the bias voltage has been supplied from a separate generator in prior balancing schemes. The use of the present scheme eliminates the complicated generator usually involved.

Figs. 3a, b and c represent the voltage output of the particular generator with different kinds of marks on the end of the shaft of the rotating mass to be balanced. The curve of Fig. 3a represents the output of the generator with a drilled hole on the end of the shaft, the curve of Fig. 3b shows the output of the generator with a keyway or a flat being used as the mark on the end of the shaft to operate the pulse generator 13, and Fig. 3c shows the output voltage of the generator with a punch mark being used to operate the pulse generator. In a balancing machine designed to handle a wide range of shaft sizes, two or three pulse generators of different sizes that could easily be changed, could be utilized or one pulse generator with an adjustable pointed arm could be used. If the end of the shaft of the rotating mass to be balanced were not square with the shaft axis, a small amount of sinusoidal running speed voltage would be induced in addition to the pulse but it would be very small in magnitude compared to the pulse and therefore would not interfere with the angle measurement.

Fig. 4a shows the bias voltage B and the generator voltage G applied to the ring demodulator wattmeter and Fig. 4b shows the output current through the meter 140 of the ring demodulator wattmeter for the case where the generator is not properly adjusted as to angle. The net D. C. current is zero. Fig. 4c shows the square wave bias voltage B and the pulse generator voltage G applied to the ring demodulator wattmeter when the generator is properly adjusted as to angle. The curve of Fig. 4d shows the D. C. output current to the meter 140 of the ring demodulator wattmeter 8 as a positive maximum. This obtains when the voltages applied to the ring demodulator wattmeter are as shown in Fig. 4c. At 180° from the proper position the net D. C. current is a negative maximum so that no ambiguity arises.

A triode or pentode vacuum tube demodulator type wattmeter could be used in place of the rectifier ring demodulator wattmeter with the advantage that considerable gain could be obtained, and possibly no additional amplifier would be necessary.

While in accordance with the patent statutes, one best known embodiment of the invention has been illustrated and described in detail, it is to be particularly understood that the invention is not limited thereto or thereby, but that equivalents are clearly within the inventive scope.

I claim as my invention:

1. Apparatus for balancing rotatable bodies, in combination, bearing means rotatably supporting said body for vibratory movement in a single plane, electrical pickup means positioned adjacent said bearing means and responsive to vibratory movement of said bearing means in said single plane for producing an electrical signal proportional to unbalance of the body, measuring means of the wattmeter type having two input circuits, each adapted to receive an electrical signal; a wave shaping circuit energized by the electrical signal of said pickup means and producing an output voltage of given configuration which is connected to one of said input circuits of said wattmeter measuring means, and circuit means controlled by the electrical signal of said pickup means and having an output connected to the other of said input circuits of said wattmeter measuring means.

2. Apparatus for balancing rotatable bodies, in combination, bearing means rotatably supporting said body for vibratory movement in a single plane, electrical pickup means positioned adjacent said bearing means and responsive to vibratory movement of said bearing means in said single plane for producing an electrical signal proportional to unbalance of the body, measuring means of the wattmeter type having two input circuits, amplifying means responsive to said electrical unbalance signal connected to supply a signal to one input circuit of said wattmeter type measuring means, and wave shaper means responsive to said electrical unbalance signal connected to supply a signal to the other input circuit of said wattmeter type measuring means.

3. Apparatus for balancing rotatable bodies, in combination, bearing means rotatably supporting said body for vibratory movement in a single plane, electrical pickup means positioned adjacent said bearing means and responsive to vibratory movement of said bearing means in said single plane for producing an electrical signal proportional to unbalance of the body, measuring means of the wattmeter type having two input circuits, amplifying means responsive to said electrical unbalance signal connected to supply a signal to one input circuit of said wattmeter type measuring means, wave shaper means responsive to said electrical unbalance signal connected to supply a signal to the other input circuit of said wattmeter type measuring means, said signal produced by said wave shaper means being a substantially square wave.

4. Apparatus for balancing rotatable bodies, in combination, bearing means rotatably supporting said body for vibratory movement in a single plane, electrical pickup means positioned adjacent said bearing means and responsive to vibratory movement of said bearing means in said single plane for producing an electrical unbalance signal proportional to unbalance of the body, measuring means for indicating the magnitude of unbalance in said rotatable body, said measuring means comprising; a bridge network having a loop circuit with first and second pairs of diagonal points and four rectifier means individually connected between each two successive diagonal points and all poled in the same sense around said loop circuit, the first pair of said diagonal points connected to receive the electrical unbalance signal of said electrical pickup, and a squaring and amplifying circuit having an input circuit energized by said electrical unbalance signal and having an output circuit connected to said second pair of diagonal points, the output of said squaring and amplifying circuit being always larger than the electrical unbalance signal applied to said first pair of diagonal points.

5. Apparatus for balancing rotatable bodies, in combination, bearing means rotatably supporting the body for vibratory movement in a single plane, electrical pickup means positioned adjacent said bearing means and responsive to vibratory movement of said bearing means in said single plane for producing an electrical unbalance signal proportional to unbalance of the body, measuring means for indicating the magnitude of unbalance in said rotatable body, said measuring means comprising a substantially balanced resistance bridge having four circuit portions of ohmic resistance series-connected with one another to form a loop circuit with four diagonal points respectively located between said circuit portions, ofur rectifier means respectively series-connected in said four circuit portions and all poled in the same sense around said loop circuit, two impedance devices respectively connected across respective pairs of diagonal points and each having a voltage midpoint, a direct-current instrument having a circuit connected across said two midpoints, circuit means connecting one impedance device to said electrical pickup means to be energized thereby, and a wave shaper circuit having an input circuit connected to said electrical pickup means to be energized by said electrical unbalance signal and having an output circuit connected to the remaining impedance device and producing a substantially square wave output of an amplitude which is always greater than the amplitude of said first voltage.

6. Apparatus for balancing rotatable bodies having magnetizable portions, in combination, bearing means rotatably supporting the body for vibratory movement in a single plane, electrical pickup means positioned adjacent said bearing means and responsive to vibratory movement of said bearing means in said single plane for producing an electrical unbalance signal proportional to the unbalance of the body, an electromagnetic pulse generator having an angularly adjustable stator disposed in flux linkage with said magnetizable portion of said body, said magnetizable portion of said body having a surface discontinuity adjacent said stator to produce a magnetic pulse therein once each revolution of the body to generate electrical pulses in said stator, measuring means of the wattmeter type having two input circuits, each adapted to receive an electrical signal; an electrical squaring circuit energized by said electrical unbalance signal and having an output connected to one input circuit of said measuring means, and circuit means connecting the stator of said pulse generator to the other input circuit of said measuring means.

7. Apparatus for balancing rotors, in combination, bearing means rotatably supporting said rotor for vibratory movement in a single plane, electrical pickup means positioned adjacent said bearing means and responsive to vibratory movement of said bearing means in said single plane for producing an electrical unbalance signal proportional to unbalance of the rotor, measuring means of the wattmeter type having two input circuits each of which is adapted to receive an electrical signal, circuit means responsive to said electrical unbalance signal and having an output circuit connected to one of said input circuits for producing a bias signal determined by said unbalance signal, an electromagnetic pulse generator coupled to be driven by said rotor to produce an electrical impulse signal once each revolution, and switch means selectively connecting the remaining input circuit of said measuring means to said electrical pickup means and to said electromagnetic pulse generator.

References Cited in the file of this patent
UNITED STATES PATENTS

| | | |
|---|---|---|
| 2,243,379 | Johnson | May 27, 1941 |
| 2,303,424 | Bendz | Dec. 1, 1942 |
| 2,325,927 | Wilbur | Aug. 3, 1943 |
| 2,559,849 | Covert | July 10, 1951 |
| 2,636,381 | Hagg et al. | Apr. 28, 1953 |